(12) United States Patent
Jacobs et al.

(10) Patent No.: US 8,171,236 B2
(45) Date of Patent: May 1, 2012

(54) MANAGING MIGRATION OF A SHARED MEMORY LOGICAL PARTITION FROM A SOURCE SYSTEM TO A TARGET SYSTEM

(75) Inventors: Stuart Z. Jacobs, Lakeville, MN (US); David A. Larson, Rochester, MN (US); Wade B. Ouren, Rochester, MN (US); Kenneth C. Vossen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 12/403,485

(22) Filed: Mar. 13, 2009

(65) Prior Publication Data
US 2009/0307447 A1  Dec. 10, 2009

Related U.S. Application Data

(60) Provisional application No. 61/059,492, filed on Jun. 6, 2008.

(51) Int. Cl.
*G06F 12/00* (2006.01)
*G06F 11/36* (2006.01)
(52) U.S. Cl. . 711/153; 711/162; 711/203; 711/E12.103; 711/E12.066; 718/100
(58) Field of Classification Search .................. None
See application file for complete search history.

(56) References Cited

U.S. PATENT DOCUMENTS

| | | | |
|---|---|---|---|
| 5,909,540 A * | 6/1999 | Carter et al. .................. 714/4.4 |
| RE36,462 E | 12/1999 | Chang et al. | |
| 7,506,095 B2 | 3/2009 | Otte et al. | |
| 7,680,754 B2 * | 3/2010 | Hillier ............................. 706/47 |
| 7,698,531 B2 * | 4/2010 | Flemming et al. ............ 711/173 |
| 7,702,843 B1 | 4/2010 | Chen et al. | |
| 2002/0010844 A1 * | 1/2002 | Noel et al. ..................... 711/153 |
| 2002/0138704 A1 * | 9/2002 | Hiser et al. .................... 711/162 |
| 2003/0084372 A1 * | 5/2003 | Mock et al. ..................... 714/15 |
| 2004/0193861 A1 * | 9/2004 | Michaelis ........................ 713/1 |
| 2005/0278719 A1 * | 12/2005 | Togawa .......................... 718/100 |
| 2006/0075207 A1 * | 4/2006 | Togawa et al. ................ 711/202 |

(Continued)

OTHER PUBLICATIONS

Armstrong et al., "System and Method for Updating a Time-Related State of a Migrating Logical Partition", U.S. Appl. No: 11/735,750, filed Apr. 16, 2007.

(Continued)

*Primary Examiner* — Reginald Bragdon
*Assistant Examiner* — Daniel Bernard
(74) *Attorney, Agent, or Firm* — Heslin Rothenberg Farley & Mesiti, P.C.

(57) ABSTRACT

Migration management is provided for a shared memory logical partition migrating from a source system to a target system. The management approach includes managing migration of the logical partition from the source system to the target system by: transferring a portion of logical partition state information for the migrating logical partition from the source system to the target system by copying at the source system contents of a logical page of the migrating logical partition into a state record buffer for forwarding to the target system; forwarding the state record buffer to the target system; and determining whether the migrating logical partition is suspended at the source system, and if not, copying at the target system contents of the state record buffer to paging storage of the target system, the paging storage being external to physical memory managed by a hypervisor of the target system.

17 Claims, 10 Drawing Sheets

U.S. PATENT DOCUMENTS

2007/0061441 A1* 3/2007 Landis et al. ............... 709/224
2008/0082696 A1* 4/2008 Bestler ......................... 711/163
2009/0100237 A1* 4/2009 Orikasa et al. ............... 711/162
2009/0307688 A1* 12/2009 Pafumi et al. .................... 718/1

OTHER PUBLICATIONS

Armstrong et al., "System and Method for Determining Firmware Compatibility for Migrating Logical Partitions", U.S. Appl. No: 11/735,770, filed Apr. 16, 2007.

Armstrong et al., "System and Method for Tracking the Memory State of a Migrating Logical Partition", U.S. Appl. No: 11/735,809, filed Apr. 16, 2007.

Jacobs et al., "System and Method for Maintaining Page Tables Used During a Logical Partition Migration", U.S. Appl. No: 11/735,830, filed Apr. 16, 2007

Office Action for U.S. Appl. No. 12/403,408 (Application No. US-2009-0307436-A1) dated Jul. 15, 2011.

Office Action for U.S. Appl. No. 12/403,426 (Application No. US-2009-0307438-A1) dated May 26, 2011.

* cited by examiner

MANAGING MIGRATION OF A SHARED
MEMORY LOGICAL PARTITION FROM A
SOURCE SYSTEM TO A TARGET SYSTEM

CROSS-REFERENCE TO RELATED
APPLICATION

This application claims the benefit of U.S. provisional application Ser. No. 61/059,492, filed Jun. 6, 2008, entitled "Virtual Real Memory", the entirety of which is incorporated herein by reference.

TECHNICAL FIELD

The present invention relates generally to data processing systems, and more particularly, to facilitating migration of a shared memory logical partition between shared memory partition data processing systems.

BACKGROUND OF THE INVENTION

Logical partitions (LPARs) running atop a hypervisor of a data processing system are often used to provide higher-level function than provided by the hypervisor itself. For example, one LPAR may be designated a virtual input/output server (VIOS), which provides input/output (I/O) services to one or more other LPARs of the data processing system. This offloading of higher-level function avoids complex code in the hypervisor, and thus, assists in maintaining the hypervisor small and secure within the data processing system.

Currently, the number of logical partitions (LPARs) that may be created on a partitionable server of the data processing system is bound by the amount of real memory available on that server. That is, if the server has 32 GBs of real memory, once the partitions have been created and have been allocated those 32 GBs of real memory, no further logical partitions can be activated on that server. This places restriction on those configurations where a customer may wish to have, for example, hundreds of logical partitions on one partitionable server.

Partitioned computing platforms have led to challenges to fully utilize available resources in the partitioned server. These resources, such as processor, memory and I/O, are typically assigned to a given partition and are therefore unavailable to other partitions on the same platform. Flexibility may be added by allowing the user to dynamically remove and add resources, however, this requires active user interaction, and can therefore be cumbersome and inconvenient. Also, memory is difficult to fully utilize in this way since there are frequently large amounts of infrequently accessed memory in idle partitions. However, that memory needs to be available to the operating system(s) to handle sudden spikes in workload requirements.

SUMMARY OF THE INVENTION

To address this need, the concept of a shared memory partition has been created. A shared memory partition's memory is backed by a pool of hypervisor-managed physical memory in the server that is shared by other shared memory partitions on that server. The amount of physical memory in the pool is typically smaller than the sum of the logical memory assigned to all of the shared memory partitions in the pool to allow the memory to be more fully utilized. Idle and/or less active logical memory in the shared partitions that does not fit in the physical memory pool is paged out by the hypervisor to a cheaper and more abundant form of paging storage (i.e., the paging devices) via an entity external to the hypervisor known as a paging service partition. In one implementation, the paging device(s) are defined in one or more physical storage disks. Disclosed herein are automated processes for facilitating live migration of a shared memory logical partition between shared memory partition data processing systems.

More particularly, provided herein, in one aspect, is a computer-implemented method of managing migration of a logical partition between shared memory partition data processing systems. The method includes managing migration of a logical partition from a source, shared memory partition data processing system (source system) to a target, shared memory partition data processing system (target system). The managing includes: transferring a portion of logical partition state information for the migrating logical partition from the source system to the target system by copying at the source system contents of a logical page of the migrating logical partition into a state record buffer for forwarding to the target system; forwarding the state record buffer to the target system; and determining whether the migrating logical partition is suspended at the source system, and if not, copying at the target system contents of the logical page from the state record buffer to paging storage of the target system, the paging storage being external to physical memory managed by a hypervisor of the target system.

In another aspect, a computing environment is provided which includes a source, shared memory partition data processing system (source system), a target, shared memory partition data processing system (target system), and a migration manager associated in part with the source system and in part with the target system. The source system includes a shared memory pool defined within physical memory of the source system managed by a hypervisor of the source system, wherein the shared memory pool includes a volume of physical memory with dynamically adjustable sub-volumes associated with different logical partitions of multiple logical partitions of the source system, and comprises logical memory pages thereof mapped to physical memory. The target system also comprises a shared memory pool defined within the physical memory of the target system managed by a hypervisor of the target system, wherein the shared memory pool of the target system includes a volume of physical memory with dynamically adjustable sub-volumes associated with different logical partition of multiple logical partitions of the target system, and includes logical memory pages thereof mapped to physical memory. The migration manager manages migration of a logical partition of the source system to the target system by: transferring a portion of logical partition state information for the migrating logical partition from the source system to the target system by copying at the source system contents of a logical page of the migrating logical partition into a state record buffer for forwarding to the target system; forwarding the state record buffer to the target system; and determining whether the migrating logical partition is suspended at the source system, and if not, copying at the target system contents of the state record buffer to paging storage of the target system, the paging storage being external to physical memory thereof managed by a hypervisor of the target system.

In a further aspect, an article of manufacture is provided which includes at least one computer-readable medium having computer-readable program code logic to manage migration of a logical partition between shared memory partition data processing systems. The computer-readable program code logic when executing on a processor performing: managing migration of a logical partition from a source, shared memory partition data processing system (source system) to a target, shared memory partition data processing system (target system), the managing comprising: transferring a portion of logical partition state information for the migrating logical partition from the source system to the target system by copying at the source system contents of a logical page of the migrating logical partition into a state record buffer for forwarding to the target system; forwarding the state record buffer to the target system; and determining whether the migrating logical partition is suspended at the source system, and if not, copying at the target system contents of the state record buffer to paging storage of the target system, the paging storage being external to physical memory managed by a hypervisor of the target system.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Before describing various automated processes for facilitating migration of a logical partition between shared memory data processing systems (in accordance with aspects of the present invention), shared memory partitions and shared memory partition data processing systems are discussed below with reference to FIGS. 1-4.

Figure 1:
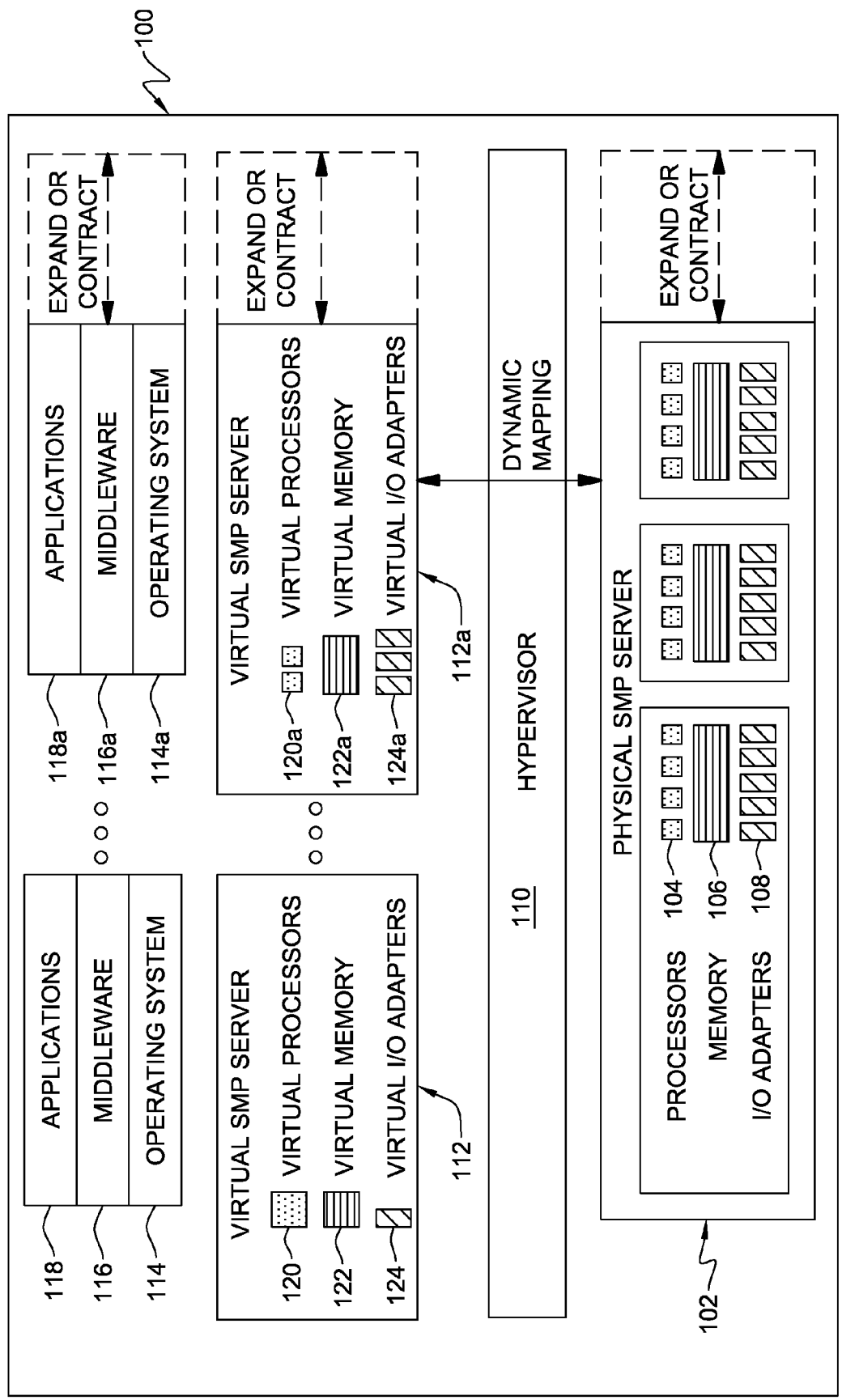
FIG. 1 is a block diagram of one embodiment of a data processing system to implement one or more aspects of the present invention.

FIG. 1 is a block diagram of a data processing system 100, which in one example, is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processor 104, memory 106, and I/O adapters 108. These physical devices are managed by hypervisor 110. Processors 104 are shared processors and each may be a simultaneous multithreading (SMT)-capable processor that is capable of concurrently executing multiple different threads on the processor.

A virtual server is a proxy for a physical server that has the same capabilities, interfaces, and state. Virtual servers are created and managed by a hypervisor that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
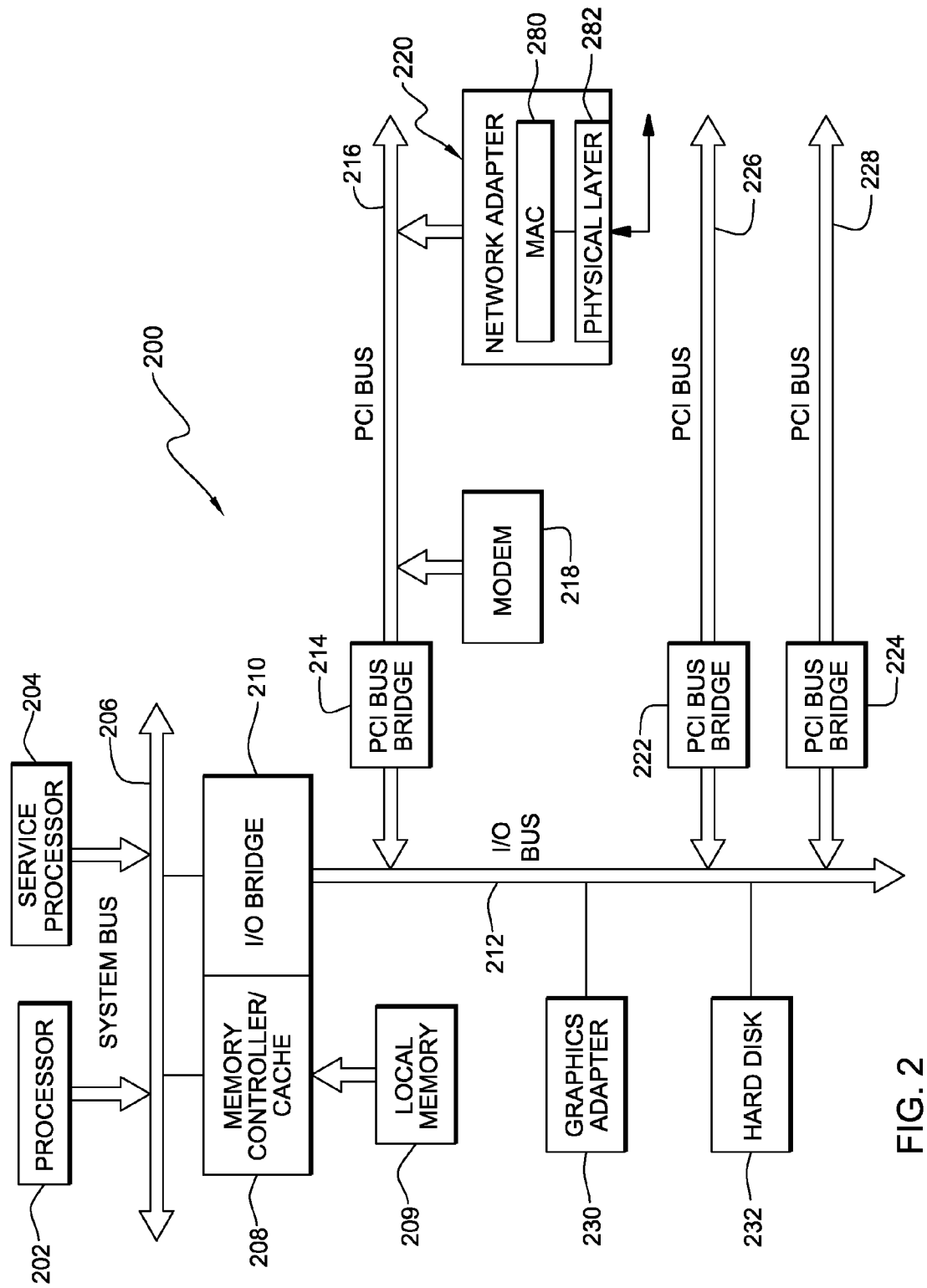
FIG. 2 is a more detailed illustration of one embodiment of a data processing system to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, a shared memory partition data processing system implementing hypervisor-managed paging such as described hereinbelow can be built upon technologies found in IBM's p/i Series product line firmware and systemware, as described in the "Power Architecture Platform Reference" (PAPR) material at Power.org (http://www.power.org/members/developers/specs/PAPR_Version_2.7_09Oct07.pdf), which is hereby incorporated herein by reference. In addition, a virtual input/output server (VIOS) is commercially available as part of a PowerVM computing system offered by International Business Machines Corporation. The VIOS allows sharing of physical resources between logical partitions, including virtual SCSI and virtual networking. This allows more efficient utilization of physical resources through sharing between logical partitions and facilitates server consolidation. (IBM, pSeries, iSeries and PowerVM are registered trademarks of International Business Machines Corporation, Armonk, N.Y., U.S.A. Other names used herein may be registered trademarks, trademarks, or product names of International Business Machines Corporation or other companies.)

Figure 3:
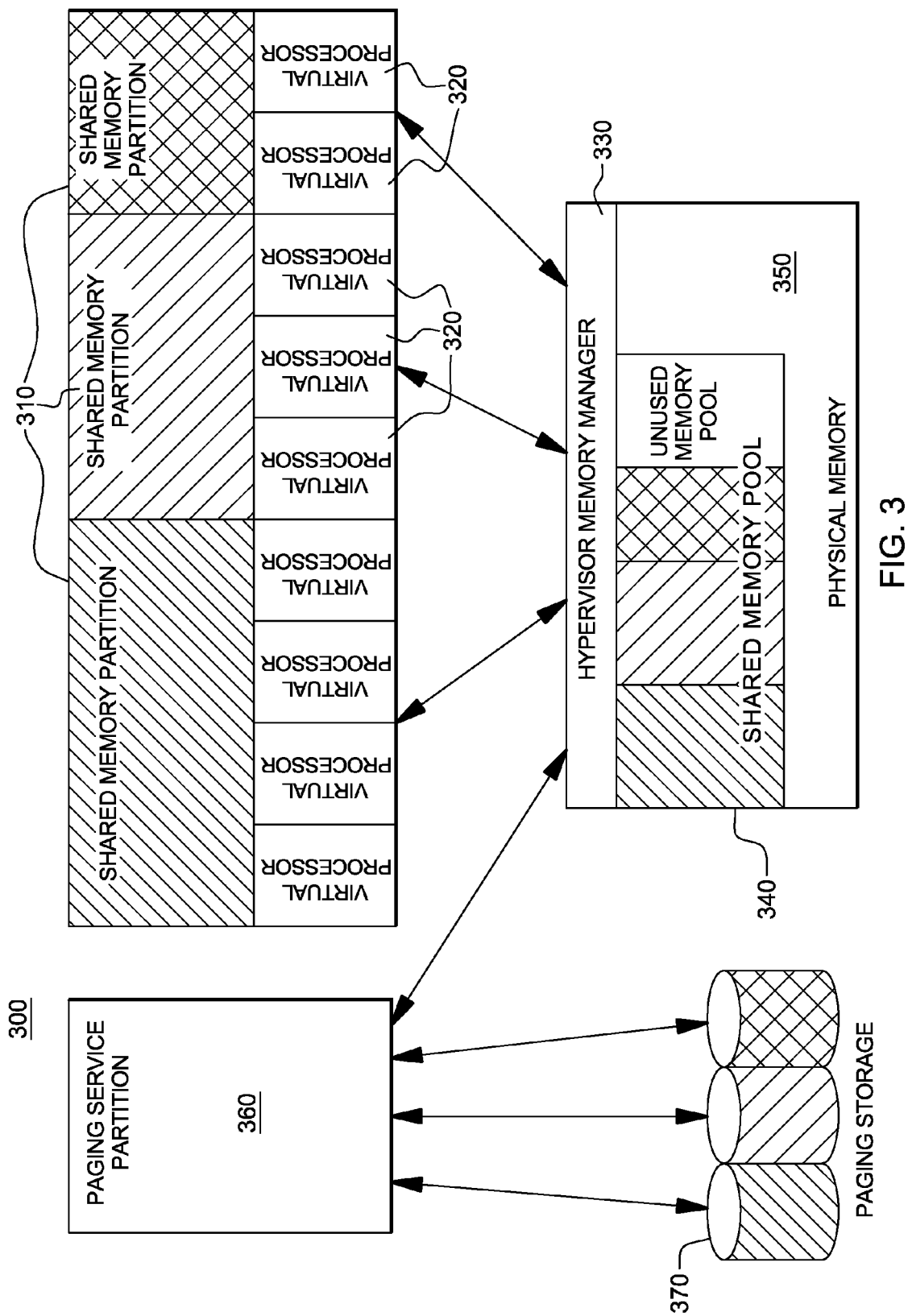
FIG. 3 illustrates one embodiment of a shared memory partition data processing system comprising multiple shared memory partitions employing a shared (or common) memory pool within physical memory of the data processing system, in accordance with an aspect of the present invention.

As noted, partition computing platforms have presented challenges to fully utilize available resources in the partitioned server. One approach to achieving this goal has been the creation of a shared memory partition data processing system, generally denoted 300, such as depicted in FIG. 3. As illustrated, the shared memory partition data processing system 300 includes one or more shared memory partitions 310, each of which comprises one or more virtual processors 320, which interface through a hypervisor, and more particularly, a hypervisory memory manager 330, to a shared memory pool 340 within physical memory 350 of the shared memory partition data processing system 300. The amount of physical memory in the pool is typically smaller than the sum of the logical memory assigned to all of the shared memory partitions 310 utilizing the shared memory pool to allow the memory to be more fully employed. Idle and/or less active logical memory of one or more shared memory partitions that does not fit in the shared memory pool 340 is paged out by the hypervisor to a more abundant, less expensive paging storage 370 (such as disk storage), via a paging service partition 360. Paging service partition 360 is an enhanced virtual input/output service (VIOS) partition configured to facilitate paging-out and paging-in of memory pages from or to, respectively, the shared memory pool.

Although referred to as a shared memory pool, in reality, there is no sharing of memory per se, but rather a sharing of the availability of a defined amount of physical memory in the pool. This shared memory pool is alternatively characterized as active memory, or virtual real memory. The amount (or volume) of memory within shared memory pool may be dynamically allocated or adjusted between the shared memory partitions into sub-volumes or sets of physical pages to accommodate workloads. These dynamically allocated or adjusted sub-volumes or sets of physical pages from the shared memory pool are associated with the multiple logical partitions, and may comprise contiguous or disparate physical memory locations within the shared memory pool. A physical memory page of the shared memory pool becomes part of a sub-volume of a particular logical partition when a logical memory page thereof is associated with or mapped to that physical page. Although referred to as a shared memory pool, there is no concurrent sharing of access to a physical page per se, but rather a sharing of the defined amount of physical memory in the pool. Each shared memory partition with at least one logical memory page mapped to a physical memory page in the pool has an associated sub-volume or set of physical memory of the shared memory pool.

The hypervisor utilizes the shared memory pool in combination with the virtual input/output (VIO) adapter connections to handle paging operations for the shared memory partitions. The hypervisor memory manager manages which physical pages map to which logical memory pages of a given shared memory partition. The management of these pages is transparent to the shared memory partitions and handled fully by the hypervisor. When a logical page is required by a shared memory partition and it does not have a physical mapping in the shared memory pool, the hypervisor treats this request to access as an internal fault (i.e., hypervisor page fault). In response to a hypervisor page fault for a logical memory page that is not resident in the shared memory pool, an input/output (I/O) paging request is allocated by the hypervisor from a pool of free I/O paging requests and sent via the paging service partition to the external page storage of the data processing system to request the needed memory page. The partition's virtual processor encountering the hypervisor page fault is concurrently placed into a wait state, which blocks further execution of that processor until the I/O paging request is satisfied, or if the hypervisor page fault occurred while external interrupts were enabled for the virtual processor, until an external or timer interrupt occurs. The I/O paging request is submitted to the VIO adapter of the paging service partition, which communicates with the paging service partition in order to retrieve and return the correct logical memory page to fulfill the hypervisor page fault. The same process is also used by the hypervisor memory manager to free up a physical page within the shared memory pool currently mapped to a logical memory page of a shared memory partition, for example, when needed by either that shared memory partition or another shared memory partition.

Figure 4:
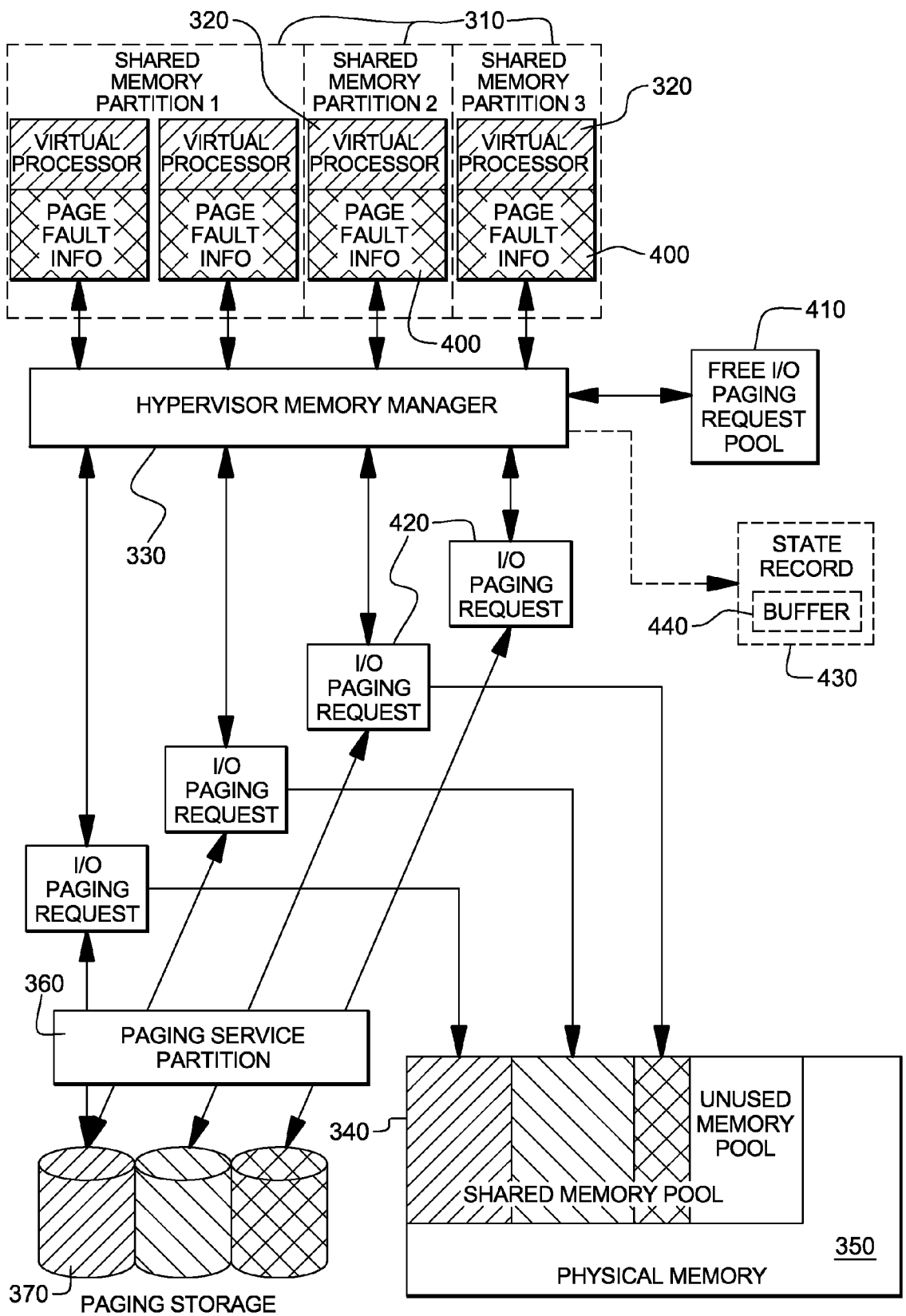
FIG. 4 illustrates one embodiment of an approach for handling hypervisor page faults within a shared memory partition data processing system, such as depicted in FIG. 3, in accordance with an aspect of the present invention.

FIG. 4 illustrates one operational embodiment of handling hypervisor page faults within a shared memory partition data processing system such as described above in connection with FIG. 3. In this embodiment, three shared memory partitions 310, i.e., shared memory partition 1, shared memory partition 2 & shared memory partition 3, are illustrated, each comprising one or more virtual processors 320, and each encountering a hypervisor page fault 400. Each hypervisor page fault is responsive to a request by a virtual processor 320 for memory that is not resident in the shared memory pool 340 of physical memory 350. Responsive to this, the hypervisor memory manager 330 takes an I/O paging request 420 from a free I/O paging request pool 410 and sends, via the paging service partition 360, the I/O paging request to the external storage entity 370 to request the needed page. Concurrent with requesting the needed page, the partition's virtual processor encountering the hypervisor page fault is placed into a wait state.

Also shown in FIG. 4 is the transfer of a logical page received from paging storage 370 to a state record 430, and more particularly, to a buffer 440 within the state record. In one embodiment, state record 430 is employed in facilitating transfer of a logical page of a migrating logical partition from a source, shared memory partition data processing system (source system) to a target, shared memory partition data processing system (target system), as described further below.

Data migration refers generally to the process of moving computer data from one computer location to another. For instance, an administrator may facilitate maintenance or updates by transferring applications and/or memory from one computer system to another computer system. Mobile partitions (MP), also known as live partition migration (LPM), is a function that allows for a running logical partition to move between physical servers with minimal impact. The hypervisor in each server is responsible for providing the infrastructure that allows for MP to occur. In order to move a running partition from one physical system to a different physical system, the entire state of the partition must be transferred. This state includes all memory assigned to the logical partition undergoing migration. An orchestrator program may communicate with the migrating partition to coordinate and otherwise facilitate the migration. This orchestrator program may be networked to or located within the source system and target system at a location suitable to manage migration of a logical partition between the systems. By way of example, logical partition migration capability is provided with the above-referenced IBM pSeries® and iSeries® product line firmware and systemware. Described herein are various extensions to this capability in the environment of a shared memory partition data processing system.

Further details on migrating logical partitions between data processing systems can also be found in the following commonly assigned U.S. patent application Ser. No. 11/735,750, entitled "System and Method for Updating a Time-Related State of a Migrating Logical Partition"; Ser. No. 11/735,809, entitled "System and Method for Tracking the Memory State of a Migrating Logical Partition"; Ser. No. 11/735,830, entitled "System and Method for Maintaining Page Tables Used During a Logical Partition Migration; and Ser. No. 11/735,770, entitled "System and Method for Determining Firmware Capability for Migrating Logical Partitions", all commonly filed on Apr. 16, 2007. Each of these commonly assigned, co-pending applications is incorporated herein by reference in its entirety.

Shared memory partitions introduce additional complexity to partition mobility. In a shared memory partition environment, the hypervisor must address additional issues beyond those of a dedicated memory partition, that is, the existence of pinned pages within the shared memory pool of the system and the lack of sufficient memory to hold all of the logical partition's memory contents at one time in the physical memory managed by the system hypervisor. In a shared memory partition data processing system, some of the logical memory pages of the migrating logical partition are thus in external paging storage at the time of migration.

While a shared memory partition is running, certain logical pages are pinned in their assigned physical memory pages of the shared memory pool so that they can not be paged-out to the external paging storage. These pinned pages include critical pages that are used by the hypervisor, which are not allowed to block, and input/output (I/O) pages being accessed by the hardware. The pinned pages thus stay resident in the physical memory of the shared memory partition data processing system while the logical partition is running. The source and target system hypervisors ensure that all logical pages pinned on the source system side of a migrating logical partition are in physical memory on the source system, and that those logical pages are pinned to physical memory on the target system prior to the migrating logical partition resuming execution on the target system.

As noted, there is typically insufficient memory in the shared memory pool in physical memory of a shared memory partition data processing system to hold all of the memory contents of the logical partitions at one time. Thus, the hypervisor at the source system addresses this issue while migrating a logical partition to a target system. The hypervisor ensures that it is able to read the contents of the memory on the source system. On the target side, its hypervisor must be able to immediately process and store contents of incoming memory state records. The thread being used on the target system to process a received state record cannot be blocked, since it is unavailable for other uses while it is processing a received state record.

Figure 5:
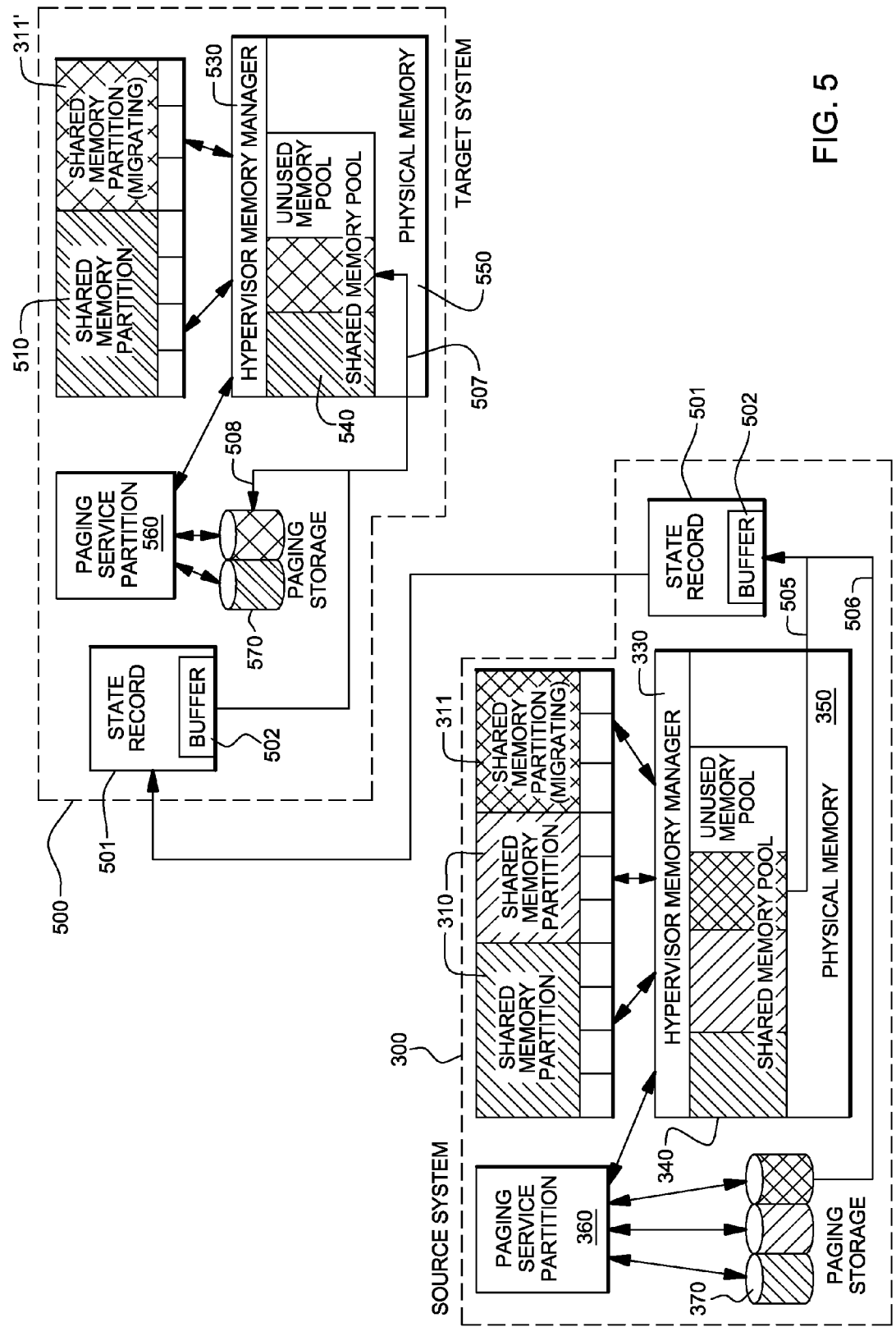
FIG. 5 illustrates one embodiment of shared memory logical partition migration from a source system to a target system, in accordance with an aspect of the present invention.

The solutions disclosed hereinbelow combine to allow for effective and efficient migration of a shared memory logical partition from a source system to a target system. FIG. 5 depicts one embodiment of this migration process. In FIG. 5, a shared memory partition 311 of a plurality of shared memory partitions 310 is being migrated from a source, shared memory partition data processing system (source system) 300 to a target, shared memory partition data processing system (target system) 500. To facilitate the migration process, a new shared memory partition 311' is established on the target system into which the logical partition state and virtual I/O is transferred from migrating shared memory partition 311 of source system 300. The source system and target system in the example of FIG. 5 are each similar to the shared memory partition data processing system of FIGS. 3 & 4. Specifically, source system 300 includes one or more shared memory partitions 310, 311, each of which may comprise one or more virtual processors, which interface through a hypervisor, and more particularly, a hypervisor memory manager 330, to a shared memory pool 340 within physical memory 350 of the shared memory partition data processing system 300. The amount of physical memory within the pool is typically larger than the sum of the logical memory assigned to all of the shared memory partitions utilizing the shared memory pool to allow the memory to be more fully employed. Idle and/or less active logical memory of one or more shared memory partitions that does not fit in the shared memory pool is paged-out by the hypervisor to a more abundant, less expensive paging storage 370 (such as disk storage) via a paging service partition 360. Paging service partition 360 is an enhanced virtual input/output service (VIOS) partition configured to facilitate page-out or page-in of memory pages from or to, respectively, the shared memory pool.

Similarly, target system 500 includes one or more shared memory partitions 510, 311', each of which comprises one or more virtual processors, which interface through a hypervisor, and more particularly, a hypervisor memory manager 530, to a shared memory pool 540 within physical memory 550 of the shared memory partition data processing system 500. Logical memory that does not fit within the shared memory pool is paged-out by the hypervisor to paging storage 570 via a paging service partition 560. In one embodiment, paging service partition 560 is an enhanced VIOS partition configured to facilitate page-out and page-in of memory pages from or to, respectively, shared memory pool 540.

In order to send a logical page from the source system to the target system, the contents of the logical memory page are copied into a buffer 502 of a state record 501. Buffer 502 is referred to herein as a state record buffer. If the logical memory page to be transferred is resident in physical memory 350, and more particularly, within the shared memory pool 340, then the operation is similar to copying of a logical memory page from a dedicated memory partition. The contents of the logical memory page are copied 505 from the physical memory page into buffer 502 of state record 501. If the logical memory page is not resident in physical memory, then the logical memory page contents must be obtained from paging storage 370. One solution to this problem is to page the contents of the logical memory page into a physical page in the shared memory pool utilizing the above-described mechanism for handling page faults while the partition is running. While effective, this solution is not most efficient since it requires a physical page to be free in the shared memory pool, which could require a page-out of a logical memory page to paging storage 370 in order to achieve.

An alternate solution, which improves efficiency by eliminating the need for a free physical page within the shared memory pool, is to copy 506 contents of the logical memory page directly into buffer 502 of state record 501, bypassing use of shared memory pool 340. This approach leaves the physical pages in the shared memory pool free to satisfy the needs of the shared memory partitions running in the shared memory pool, and therefore, does not negatively impact performance of the logical partitions by reducing availability of the physical memory in the shared memory pool.

While this solution eliminates the need for a free physical page in the shared memory pool, the logical memory page must still be read-in from the paging storage space to the state record buffer. In certain situations, the solution can be further extended to eliminate this step. Since the hypervisor is managing the shared memory pool, prior to page-out a logical memory page for migrating logical partition 311, the hypervisor checks to determine whether the logical memory page being paged-out to paging storage at the source system needs to be transferred to the target system. If so, then the hypervisor copies the contents of the logical page into the state record buffer, and then pages-out the logical page to the source system's paging storage space 370. This eliminates the need to later read the contents of the logical page from the paging storage space to fill in the state record, thereby improving efficiency of the live partition migration process.

In addition, through cooperative memory management, partitions in a shared memory pool can specify page hints to the hypervisor. These page hints may indicate that a page of logical memory is unused, meaning its contents no longer need to be preserved. During shared memory partition migration, the hypervisor can recognize pages that have been marked as unused, and thus avoid reading and sending of those pages to the target system. This further improves efficiency of the migration process.

At the target system, when a state record is received from the source system, the logical memory contents in the state record must be stored. Receipt of a state record is handled slightly different for logical pages that were pinned on the source side than those that were not. For non-pinned logical pages, one solution is to copy the logical memory contents into a free physical page in the shared memory pool of the target system. This may require a page-out operation to free a physical page in the shared memory pool, which could result in a delay in handling the state record, thereby holding off other processes that need to execute.

An alternate solution presented below is to improve efficiency of the operation by eliminating the need for a free physical page in the shared memory pool of the target system. Initially, as state records arrive in the target system, contents of non-pinned pages are copied 508 directly to the paging storage space 570. This bypasses the use of an intermediary page in the shared memory pool, ensuring that the hypervisor does not have to wait for a page to be paged-out to handle the state record. When the partition is suspended (which implies that the majority of the partition's memory has been transferred to the target system and is now just running with its working set of memory), as state records arrive on the target system, contents of the logical memory may be copied 507 into the shared memory pool. If there are not any free pages available, then the contents could be copied directly to the paging storage space 570. This solution is advantageous because initially, that is, prior to suspension, copying of the pages to the paging storage space leaves free pages in the shared memory pool available, which may subsequently be used to copy the logical partition's working set of logical pages into once the partition is suspended. This improves the performance of the partition when it resumes on the target system, because its working set of memory will already be available, and need not be paged-in to the target system's shared memory pool.

For pinned logical pages of the source system, contents of the logical memory may be copied at the target system into a free physical page in its shared memory pool, which may require a page-out operation to free a page. After the contents of the logical page are copied into the physical page, however, the page will be pinned. Since these pages must be resident in memory and pinned prior to the partition resuming on the target system, they cannot be simply copied to the paging storage space when they arrive. The majority of these pinned logical pages from the source system are transferred from the source system to the target system while the logical partition is suspended.

One solution is to require paging-out of logical pages in the shared memory pool of the target system to free up pages for the contents of the pinned, logical pages. However, this could result in the migrating logical partition being suspended for a longer time interval, causing high-level I/O time-outs to occur (e.g., network connections may drop) and the partition to be noticeably unavailable to the users.

Another solution, described hereinbelow, is to ensure that free physical pages are available in the shared memory of the target system to copy contents of the pinned, logical memory (of the source system) into when they arrive on the target system. When the migration is started, the entire entitled capacity of the migrating logical partition (i.e., the maximum number of logical pages that can be pinned to physical memory at one time) is reserved in the shared memory pool on the target system. This provides guaranteed free pages to place the contents of the pinned logical pages into at the target system, and allows the pages to be immediately pinned. As state records arrive on the target system, the contents of pinned logical pages of the source system are copied into these free, reserved physical pages in the shared memory pool of the target system.

FIGS. 6-9 depict embodiments of migration manager logic at the source system and target system for implementing the above-noted concepts. In one embodiment, the migration manager logic is implemented within or in associated with the respective hypervisors of the source and target systems.

Figure 6:
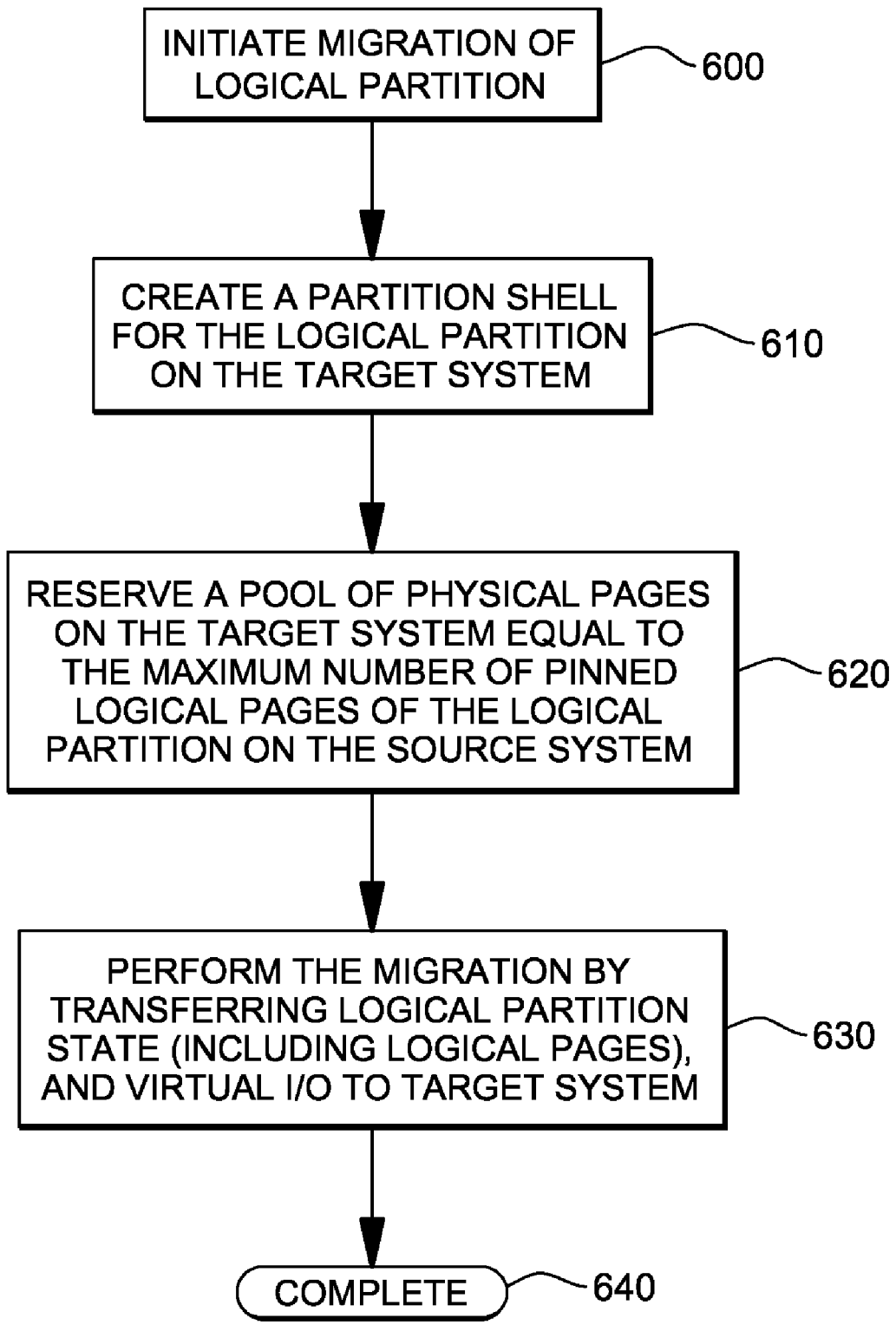
FIG. 6 is a flowchart of one embodiment of logic for managing migration of a shared memory logical partition from a source system to a target system, in accordance with an aspect of the present invention.

Referring first to FIG. 6, logic is presented for managing migration of a shared memory logical partition from a source system to a target system. Migration of a logical partition is initiated 600 by, for example, an orchestrator program (or migration manager) resident on or coupled to the source system. Responsive to initiation of migration, a shared memory logical partition shell for the migrating logical partition is created on the target system 610, and a pool of physical pages is reserved within the shared memory pool of the target system equal to the maximum number of pinned logical pages of the migrating logical partition on the source system 620. Thereafter, the migration is performed by transferring logical partition state information (including the logical memory pages) and virtual I/O of the migrating logical partition to the target system 630, which once transferred, and the logical partition is resumed on the target system, completes the migration process 640.

Figure 7:
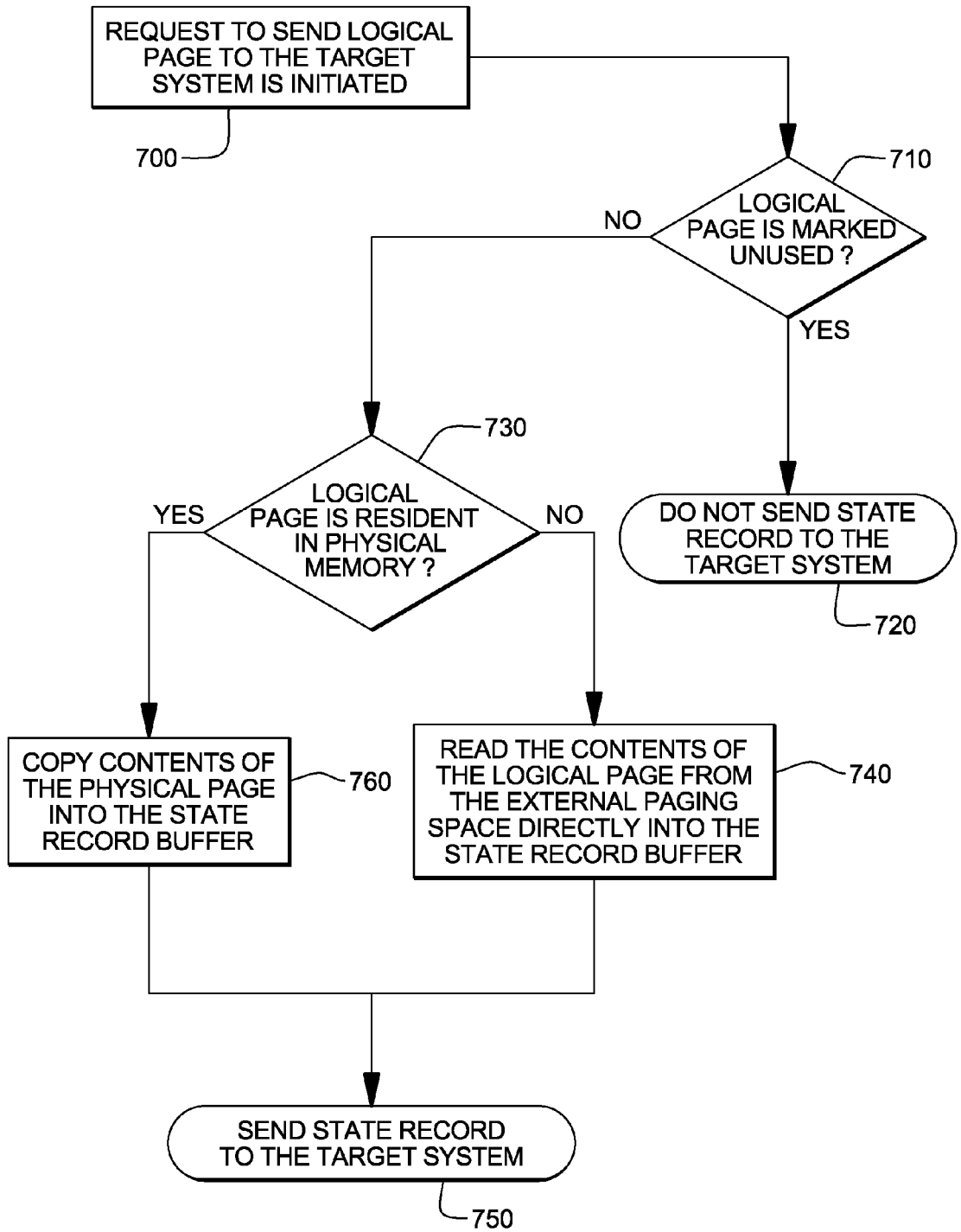
FIG. 7 is a flowchart of one embodiment of logic for sending a logical page of a migrating logical partition from a source system to a target system, in accordance with an aspect of the present invention.

FIG. 7 is a flowchart of one embodiment of logic for sending a logical page of a migrating logical partition from a source system to a target system. A request is initiated to send a logical page of the migrating logical partition to the target system 700. The logic determines whether the logical page to be sent is marked as unused 710, via the above-noted hint(s) to the hypervisor of the source system. If "yes", then the state record is not sent to the target system 720. Essentially, the contents of the logical page are thrown away as not being used by the migrating logical partition. For example, the logical page contents are set to zero. If the logical page is not marked unused, then a determination is made whether the logical page is resident in physical memory (that is, the shared memory pool) of the source system 730. If "no", then the contents of the logical page are read from the external paging space directly into the state record buffer 740, and the state record is sent to the target system 750. If the logical page is resident in physical memory of the source system, then contents of the corresponding physical page of the shared memory pool are copied from physical memory into the state record buffer 760, which is then sent to the target system 750.

Figure 8:
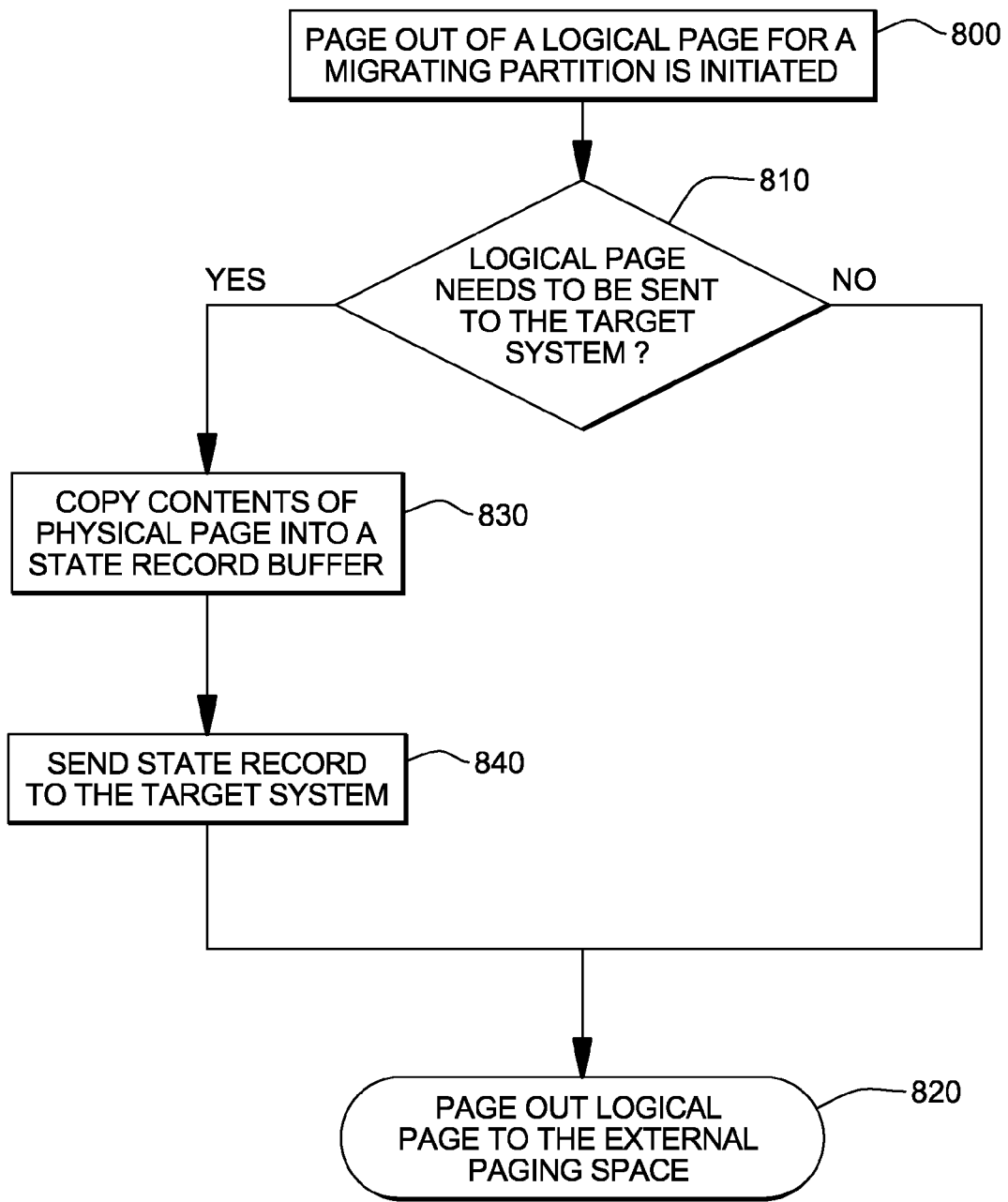
FIG. 8 is a flowchart of one embodiment of logic for facilitating sending of a logical page of a migrating logical partition from a source system to a target system, in accordance with an aspect of the present invention.

FIG. 8 is a flowchart of one embodiment of logic for enhancing sending of a logical page of a migrating logical partition from a source system to a target system. Specifically, when page-out of a logical memory page is initiated at the source system for a shared memory partition undergoing migration 800, the hypervisor determines whether the logical page needs to be sent to the logical system 810. If "no", then the logical memory page is simply paged-out to external paging space 820, as described above in connection with FIGS. 3 & 4. However, if the logical page to be paged-out is still to be sent to the target system as part of the migration process, then the contents of the physical page of the shared memory pool being paged-out are copied to the state record buffer 830 for forwarding to the target system 840, before or commensurate with the logical memory page being paged-out to external paging space of the source system 820.

Figure 9:
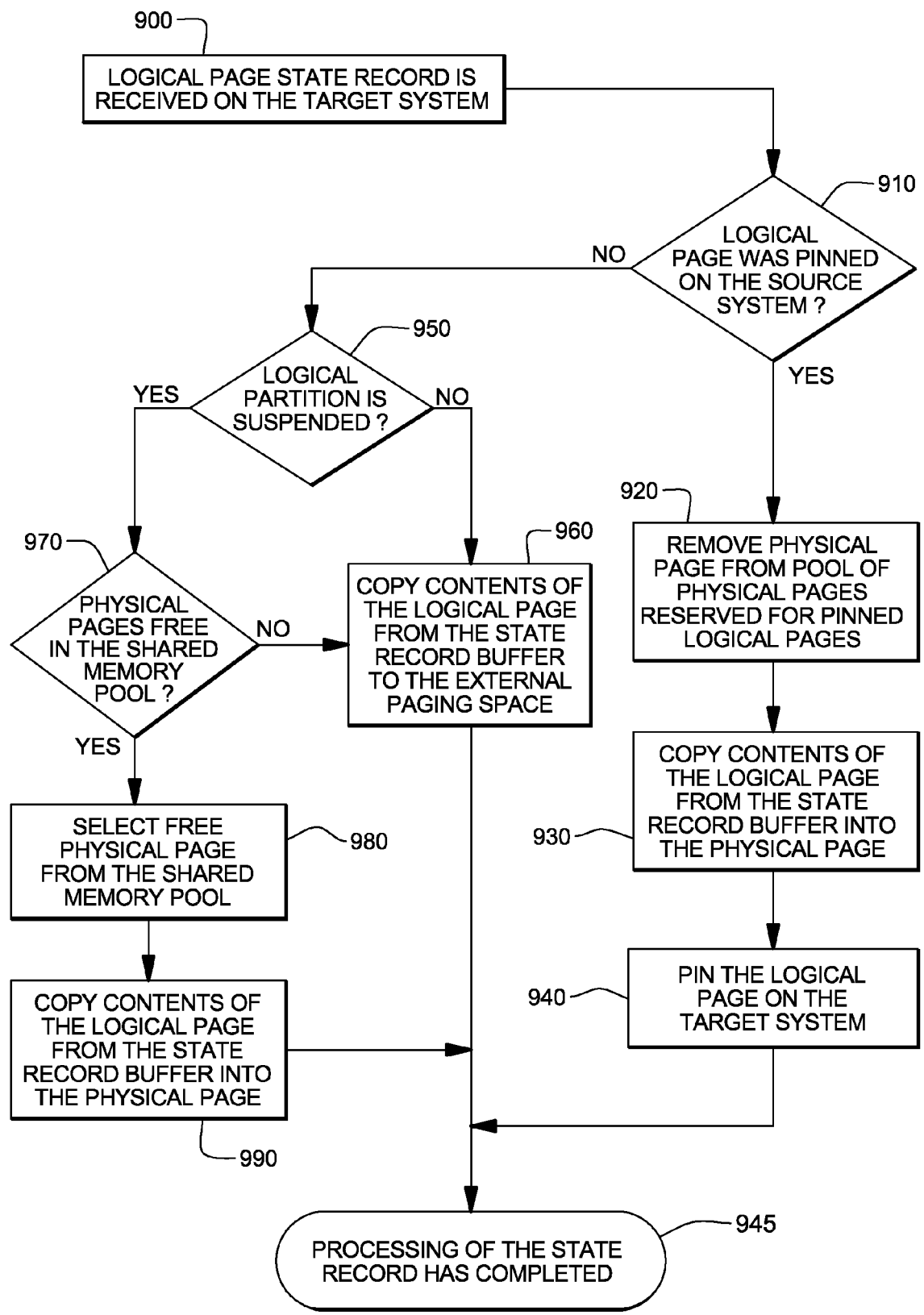
FIG. 9 is a flowchart of one embodiment of logic for receiving a logical page of a migrating logical partition at a target system, in accordance with an aspect of the present invention.

FIG. 9 depicts one embodiment of logic implemented at the target system for receiving and storing a logical page of a migrating logical partition. Responsive to receipt of a logical page state record at the target system 900, a determination is made whether the logical page was pinned at the source system 910. If "yes", then a physical page is removed from the pool of physical pages reserved for pinned, logical pages of the migrating logical partition 920, and contents of the logical page are copied from the state record buffer into that physical page 930. The logical page on the target system is then pinned to the physical memory in the shared memory pool 940, which completes processing of the state record 945.

Assuming that the logical page was unpinned at the source system, then the logic determines whether the logical partition is suspended 950, that is, not executing on either the source system or the target system. Both the source and target systems are provided with information on the state of the migrating shared memory partition. If the migrating logical partition is executing, then contents of the logical page are copied from the state record buffer into the external paging space of the target system 960, which completes processing of the state record 945. If the logical partition is suspended, then a determination is made whether there is any free physical page in the shared memory pool of the target system 970. If "no", then the contents of the logical page are copied from the state record buffer to the external paging space of the target system 960. However, if a physical page is free in the shared memory pool of the target system, then the free physical page is removed from the shared memory pool 980 and contents of the logical page are copied from the state record buffer into the free physical page of the shared memory pool 990, which completes processing of the state record 945.

Further details on shared memory partition data processing systems are provided in the following, co-filed patent applications, the entirety of each of which is hereby incorporated herein by reference: "Hypervisor-Based Facility for Communicating Between a Hardware Management Console and a Logical Partition", U.S. Ser. No. 12/403,402; "Hypervisor Page Fault Processing in a Shared Memory Partition Data Processing System", U.S. Ser. No. 12/403,408; "Managing Assignment of Partition Services to Virtual Input/Output Adapters", U.S. Ser. No. 12/403,416; "Automated Paging Device Management in a Shared Memory Partition Data Processing System", U.S. Ser. No. 12/403,426; "Dynamic Control of Partition Memory Affinity in a Shared Memory Partition Data Processing System", U.S. Ser. No. 12/403,440; "Transparent Hypervisor Pinning of Critical Memory Areas in a Shared Memory Partition Data Processing System", U.S. Ser. No. 12/403,447; "Shared Memory Partition Data Processing System with Hypervisor Managed Paging", U.S. Ser. No. 12/403,459; and "Controlled Shut-Down of Partitions Within a Shared Memory Partition Data Processing System", U.S. Ser. No. 12/403,472.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 10:
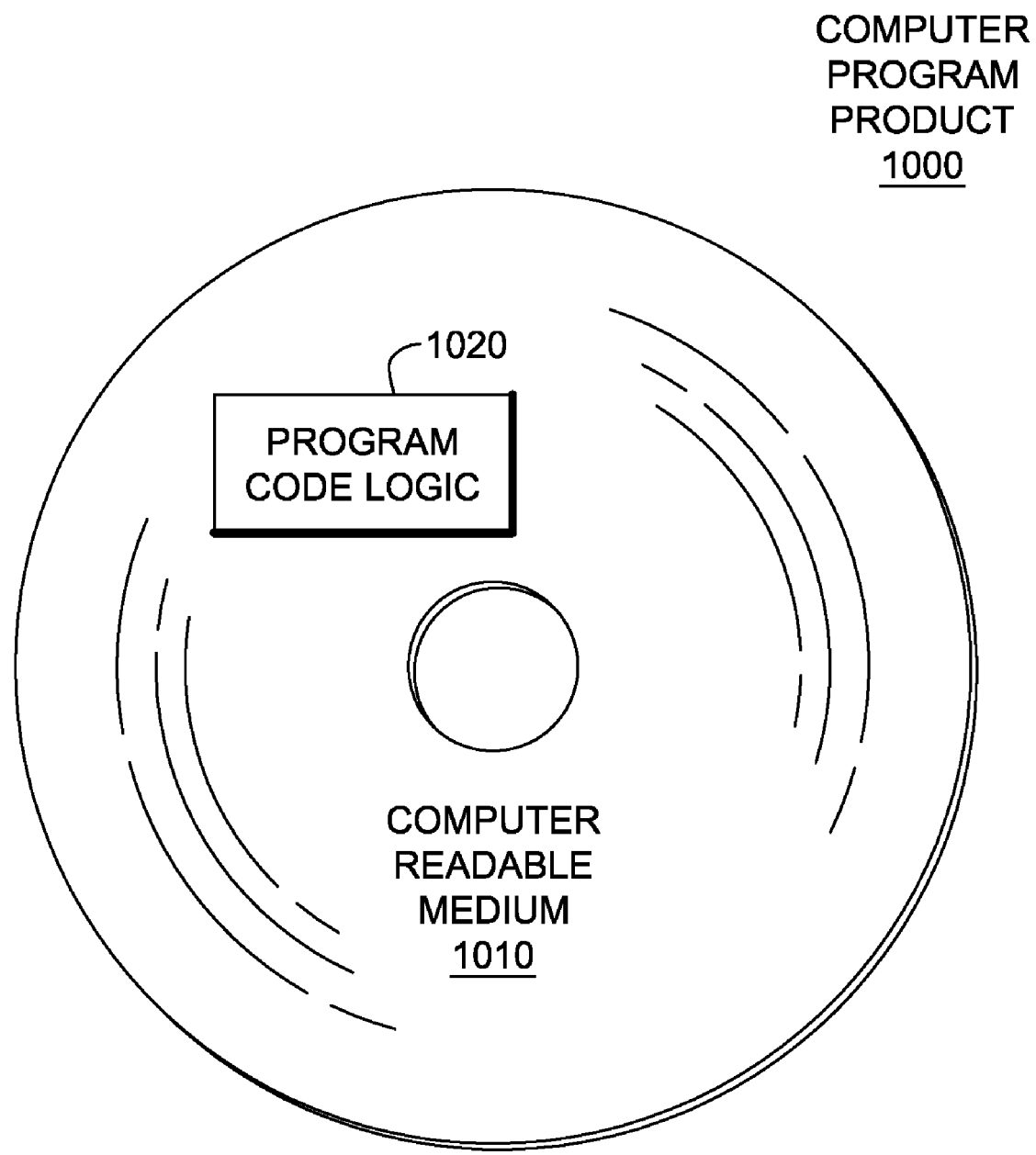
FIG. 10 depicts one embodiment of a computer program product incorporating one or more aspects of the present invention.

One example of an article of manufacture or a computer program product incorporating one or more aspects of the present invention is described with reference to FIG. 10. A computer program product 1000 includes, for instance, one or more computer-readable media 1010 to store computer readable program code means or logic 1020 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although various embodiments are described above, these are only examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of managing migration of a logical partition between shared memory partition data processing systems, the method comprising:
    managing migration of a logical partition from a source, shared memory partition data processing system (source system) to a target, shared memory partition data processing system (target system), the managing comprising:

transferring a portion of logical partition state information for the migrating logical partition from the source system to the target system by copying at the source system contents of a logical page of the migrating logical partition into a state record buffer for forwarding to the target system;

forwarding the state record buffer to the target system;

determining whether the migrating logical partition is suspended at the source system, and if not, copying at the target system contents of the state record buffer to paging storage of the target system, the paging storage being external to physical memory managed by a hypervisor of the target system; and wherein if the migrating logical partition is suspended at the source system, then the determining further comprises determining whether there is a free physical memory page in a shared memory pool of the physical memory at the target system, and if yes, copying contents of the logical page from the state record buffer into the free physical memory page in the shared memory pool of the target system.

2. The method of claim 1, wherein if the migrating logical partition is suspended on the source system and there is no free physical memory page in the shared memory pool of the target system, the method further comprises copying contents of the logical page from the state record buffer into the paging storage of the target system.

3. The method of claim 1, wherein when the migrating logical partition is suspended on the source system, the method further comprises determining whether the logical page is pinned to physical memory managed by a hypervisor of the source system, and if so, selecting a physical memory page from a pool of physical memory pages in a shared memory pool of physical memory at the target system, copying contents of the logical page from the state record buffer into that physical memory page and pinning the logical page thereto on the target system, wherein the pool of physical memory pages is a pool of reserved memory pages at the target system for pinned logical pages at the source system of the migrating logical partition.

4. The method of claim 3, further comprising, prior to migrating the logical partition from the source system to the target system, reserving for the migrating logical partition the pool of physical memory pages in the shared memory pool of the target system, the pool of physical memory pages containing a number of physical memory pages selected with reference to a maximum number of logical pages of the migrating logical partition which could be pinned to physical memory managed by a hypervisor at the source system.

5. The method of claim 1, wherein the copying at the source system further comprises determining whether the logical page is resident in a shared memory pool in physical memory managed by a hypervisor of the source system, and if yes, copying contents of the logical page from the respective physical memory page of the shared memory pool into the state record buffer, otherwise, reading contents of the logical page from paging storage of the source system, the paging storage of the source system being external to the physical memory managed by the hypervisor of the source system.

6. The method of claim 1, wherein the copying at the source system is responsive to initiation of page-out of the logical page to paging storage of the source system, the paging storage being external to a shared memory pool in physical memory managed by a hypervisor of the source system, and wherein the page-out further comprises determining whether the logical page is to be sent to the target system, and if yes, copying contents of the logical page from a physical memory page of the shared memory pool into the state record buffer for forwarding to the target system, then completing page-out of the logical page to the paging storage of the source system.

7. A computing environment comprising:

a source, shared memory partition data processing system (source system), the source system comprising a shared memory pool defined within physical memory of the source system managed by a hypervisor of the source system;

a target, shared memory partition data processing system (target system), the target system comprising a shared memory pool defined within physical memory of the target system managed by a hypervisor of the target system;

a migration manager associated in part with the source system and in part with the target system, the migration manager managing migration of a logical partition of the source system to the target system, the managing comprising:

transferring a portion of logical partition state information for the migrating logical partition from the source system to the target system by copying at the source system contents of a logical page of the migrating logical partition into a state record buffer for forwarding to the target system;

forwarding the state record buffer to the target system;

determining whether the migrating logical partition is suspended at the source system, and if not, copying at the target system contents of the state record buffer to paging storage of the target system, the paging storage being external to physical memory thereof managed by a hypervisor of the target system; and wherein if the migrating logical partition is suspended at the source system, then the determining further comprises determining whether there is a free physical memory page in the shared memory pool of the physical memory at the target system, and if yes, copying contents of the logical page from the state record buffer into the free physical memory page in the shared memory pool of the target system, and wherein if the migrating logical partition is suspended on the source system and there is no free physical memory page in the shared memory pool of the target system, then copying contents of the logical page from the state record buffer into the paging storage of the target system.

8. The computing environment of claim 7, wherein when the migrating logical partition is suspended on the source system, the migration manager further comprises determining whether the logical page is pinned to the physical memory managed by the hypervisor of the source system, and if so, selecting a physical memory page from a pool of physical memory pages in the shared memory pool of physical memory at the target system, copying contents of the logical page from the state record buffer into that physical memory page and pinning the logical page thereto on the target system, wherein the pool of physical memory pages is a pool of reserved memory pages at the target system for pinned logical pages at the source system of the migrating logical partition.

9. The computing environment of claim 8, wherein the migration manager further comprises, prior to migrating the logical partition from the source system to the target system, reserving for the migrating logical partition the pool of physical memory pages in the shared memory pool of the target system, the pool of physical memory pages containing a number of physical memory pages selected with reference to a maximum number of logical pages of the migrating logical partition which could be pinned to physical memory managed by the hypervisor of the source system.

10. The computing environment of claim 7, wherein the copying at the source system further comprises determining whether the logical page is resident in the shared memory pool in physical memory managed by the hypervisor of the source system, and if yes, copying contents of the logical page from the respective physical memory page of the shared memory pool into the state record buffer, otherwise reading contents of the logical page from paging storage of the source system, the paging storage of the source system being external to the physical memory managed by the hypervisor of the source system.

11. The computing environment of claim 7, wherein the copying at the source system is responsive to initiation of page-out of the logical page to paging storage of the source system, the paging storage being external to the shared memory pool in physical memory managed by the hypervisor of the source system, and wherein the page-out further comprises determining whether the logical page is to be sent to the target system, and if yes, copying contents of the logical page from the physical memory page of the shared memory pool into the state record buffer for forwarding to the target system, then completing page-out of the logical page to the paging storage of the source system.

12. An article of manufacture comprising:
at least one non-transitory computer-readable medium having computer-readable program code logic to manage migration of a logical partition between shared memory partition data processing systems, the computer-readable program code logic when executing on a processor performing:
managing migration of a logical partition from a source, shared memory partition data processing system (source system) to a target, shared memory partition data processing system (target system), the managing comprising:
transferring a portion of logical partition state information for the migrating logical partition from the source system to the target system by copying at the source system contents of a logical page of the migrating logical partition into a state record buffer for forwarding to the target system;
forwarding the state record buffer to the target system;
determining whether the migrating logical partition is suspended at the source system, and if not, copying at the target system contents of the state record buffer to paging storage of the target system, the paging storage being external to physical memory managed by a hypervisor of the target system; and
wherein if the migrating logical partition is suspended at the source system, then the determining further comprises determining whether there is a free physical memory page in a shared memory pool of the physical memory at the target system, and if yes, copying contents of the logical page from the state record buffer into the free physical memory page in the shared memory pool of the target system.

13. The article of manufacture of claim 12, wherein if the migrating logical partition is suspended on the source system and there is no free physical memory page in the shared memory pool of the target system, the method further comprises copying contents of the logical page from the state record buffer into the paging storage of the target system.

14. The article of manufacture of claim 12, wherein when the migrating logical partition is suspended on the source system, the method further comprises determining whether the logical page is pinned to physical memory managed by a hypervisor of the source system, and if so, selecting a physical memory page from a pool of physical memory pages in a shared memory pool of physical memory at the target system, copying contents of the logical page from the state record buffer into that physical memory page and pinning the logical page thereto on the target system, wherein the pool of physical memory pages is a pool of reserved memory pages at the target system for pinned logical pages at the source system of the migrating logical partition.

15. The article of manufacture of claim 14, further comprising, prior to migrating the logical partition from the source system to the target system, reserving for the migrating logical partition the pool of physical memory pages in the shared memory pool of the target system, the pool of physical memory pages containing a number of physical memory pages selected with reference to a maximum number of logical pages of the migrating logical partition which could be pinned to physical memory managed by a hypervisor at the source system.

16. The article of manufacture of claim 12, wherein the copying at the source system further comprises determining whether the logical page is resident in a shared memory pool in physical memory managed by a hypervisor of the source system, and if yes, copying contents of the logical page from the respective physical memory page of the shared memory pool into the state record buffer, otherwise, reading contents of the logical page from paging storage of the source system, the paging storage of the source system being external to the physical memory managed by the hypervisor of the source system.

17. The article of manufacture of claim 12, wherein the copying at the source system is responsive to initiation of page-out of the logical page to paging storage of the source system, the paging storage being external to a shared memory pool in physical memory managed by a hypervisor of the source system, and wherein the page-out further comprises determining whether the logical page is to be sent to the target system, and if yes, copying contents of the logical page from a physical memory page of the shared memory pool into the state record buffer for forwarding to the target system, then completing page-out of the logical page to the paging storage of the source system.

* * * * *